US009483202B2

(12) United States Patent
Barve

(10) Patent No.: US 9,483,202 B2
(45) Date of Patent: Nov. 1, 2016

(54) RAPID CLONING OF DATA OBJECTS BACKED BY NON-CONTIGUOUS EXTENTS

(71) Applicant: NetApp, Inc., Sunnyvale, CA (US)

(72) Inventor: Anagha Barve, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 330 days.

(21) Appl. No.: 13/947,790

(22) Filed: Jul. 22, 2013

(65) Prior Publication Data

US 2013/0339645 A1 Dec. 19, 2013

Related U.S. Application Data

(63) Continuation of application No. 12/965,760, filed on Dec. 10, 2010, now Pat. No. 8,688,636.

(51) Int. Cl.
| G06F 7/00 | (2006.01) |
| G06F 17/30 | (2006.01) |
| G06F 3/06 | (2006.01) |
| G06F 11/14 | (2006.01) |
| G06F 11/20 | (2006.01) |
| G06F 9/455 | (2006.01) |

(52) U.S. Cl.
CPC ............. *G06F 3/065* (2013.01); *G06F 3/0614* (2013.01); *G06F 3/0683* (2013.01); *G06F 9/45558* (2013.01); *G06F 11/1456* (2013.01); *G06F 11/2082* (2013.01); *G06F 17/30067* (2013.01); *G06F 17/30575* (2013.01); *G06F 17/30581* (2013.01); *G06F 17/30584* (2013.01); *G06F 2009/45562* (2013.01); *G06F 2009/45579* (2013.01)

(58) Field of Classification Search
CPC ............... G06F 17/30575; G06F 17/30067; G06F 17/30581; G06F 17/30584
See application file for complete search history.

(56) References Cited

U.S. PATENT DOCUMENTS

| 7,996,361 | B1 * | 8/2011 | Shah ................. G06F 17/30073 707/626 |
| 8,151,263 | B1 | 4/2012 | Venkitachalam et al. |
| 8,352,938 | B2 * | 1/2013 | Hunt ..................... G06F 9/4856 718/1 |
| 2003/0194208 | A1 | 10/2003 | Inoue et al. |
| 2006/0101189 | A1 | 5/2006 | Chandrasekaran et al. |
| 2007/0260830 | A1 | 11/2007 | Faibish et al. |
| 2008/0134178 | A1 | 6/2008 | Fitzgerald et al. |
| 2008/0184225 | A1 | 7/2008 | Fitzgerald et al. |
| 2009/0094603 | A1 | 4/2009 | Hiltgen et al. |
| 2011/0154331 | A1 * | 6/2011 | Ciano ................. G06F 9/45558 718/1 |
| 2011/0173401 | A1 * | 7/2011 | Usgaonkar ............ G06F 3/0608 711/162 |
| 2012/0016840 | A1 * | 1/2012 | Lin ..................... G06F 11/2097 707/626 |
| 2012/0023292 | A1 | 1/2012 | Saito et al. |
| 2012/0066183 | A1 | 3/2012 | Adkins et al. |
| 2014/0229443 | A1 * | 8/2014 | Picken .............. G06F 17/03174 707/639 |

* cited by examiner

*Primary Examiner* — Loan T Nguyen

(74) *Attorney, Agent, or Firm* — Cooper Legal Group, LLC

(57) ABSTRACT

A request is received to clone a source data object. A source block range of the source data object in a source logical storage unit is determined. An empty data object in the destination logical storage unit is created. A destination block range of the empty data object in the destination logical storage unit is determined. The source block range is mapped to the destination block range. The source data object is cloned based on the mapping.

20 Claims, 10 Drawing Sheets

RAPID CLONING OF DATA OBJECTS BACKED BY NON-CONTIGUOUS EXTENTS

CROSS-REFERENCES TO RELATED APPLICATIONS

This application is a continuation of co-pending U.S. application Ser. No. 12/965,760, filed Dec. 10, 2010.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2010, NetApp, Inc. All Rights Reserved.

FIELD OF THE INVENTION

This invention relates generally to storage systems, and more particularly to rapid cloning of virtual machines in a storage system.

BACKGROUND

A virtual machine is the representation of a physical machine by software. A virtual machine has its own set of virtual hardware (e.g., random access memory (RAM), central processing unit (CPU), network interface card (NIC), hard disks, etc.) upon which an operating system and applications are loaded. The virtual machine operating system sees a consistent, normalized set of hardware regardless of the actual physical hardware components. In a virtualized environment, a physical host machine (e.g., a computer) runs virtualization software such as a hypervisor and abstracts physical hardware (e.g., processors, memory, storage and networking resources, etc.) to be provisioned to one or more virtual machines. Storage on a storage system is mapped to the physical host machine such that the physical host machine can use the storage.

A guest operating system (e.g., Windows™, etc.) may be installed on each of the virtual machines. The virtualization software presents the physical hardware of the host machine as virtual hardware to the guest operating system and applications running in the guest operating system. A user may access the virtual machine to perform computing tasks as if it were a physical machine. For example, a user may want to rapidly clone a file, or data object.

The storage system includes an operating system, such as NetApp® Data ONTAP™. The storage system operating system provides single instance storage (sis) clone functionality, which can be used to create a clone of an entire Logical Unit Number (LUN). The storage system operating system can provide the capability to perform sub LUN cloning by providing as input a logical block address (LBA) range to be cloned and a block range of the destination to store the clone. However, when the entity to be cloned is a file present on a file system such as New Technology File System (NTFS), the LBA range of the file is not known. Furthermore, the cloned blocks in the destination are not recognized as a file by the destination NTFS.

Rapid cloning capabilities provided by virtual machine managers such as Windows System Center Virtual Machine Manager® (SCVMM) use Windows Background Transfer Service® (BITS) technology and do not provide significant performance gain over traditional file copy. Moreover, virtual machine managers' rapid cloning is time intensive and uses a significant amount of memory.

SUMMARY

Rapid cloning of virtual machines is performed by receiving a request to clone a source data object (virtual machine). A source block range of the source data object in a source logical storage unit is determined. An empty data object in the destination logical storage unit is created. A destination block range of the empty data object in the destination logical storage unit is determined. The source block range is mapped to the destination block range. The source data object is cloned based on the mapping.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Embodiments are described for a rapid cloning of virtual machines on LUNs. References in this specification to "an embodiment". "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

Rapid cloning of a source data object is performed by determining a source block range of the source data object, creating an empty data object in a destination logical storage unit, determining a destination block range of the empty data object in the destination logical storage unit, and mapping the source block range to the destination block range of the empty data object.

Cloning a file does not require a physical copy of data involved, and is therefore a fast and time-efficient process. Furthermore, the cloning of a file is performed off-host, and therefore does not consume any resources from the host itself. In one embodiment, a user requests a clone of a virtual machine running on LUNs mapped to a Windows host. In an alternate embodiment, a user requests provisioning virtual machines (e.g., desktops) using a virtual machine template. In another embodiment, a user requests conversion of a physical machine to a virtual machine. In yet another embodiment, a user requests a virtual machine to be moved from one LUN to another LUN. Still in yet another alternate embodiment, a user requests restoring a subset of files from a LUN in a snapshot back to an original LUN.

Figure 1:
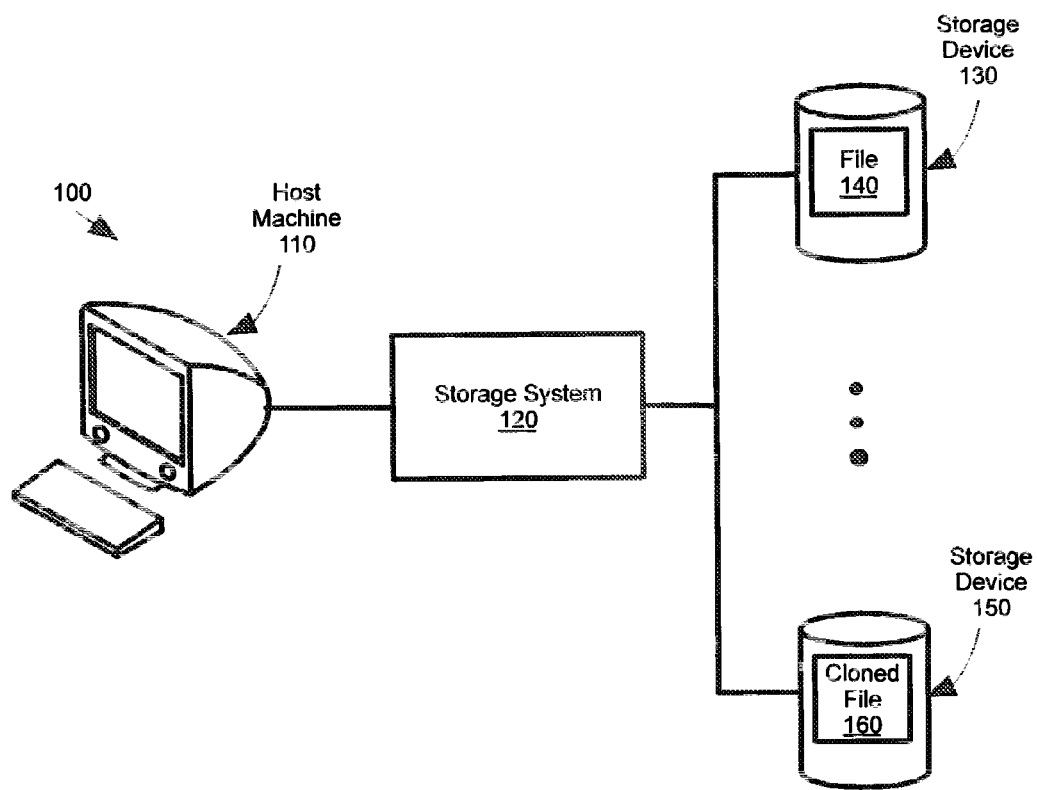
FIG. 1 illustrates an exemplary rapid cloning implementation according to an embodiment.
Figure 2:
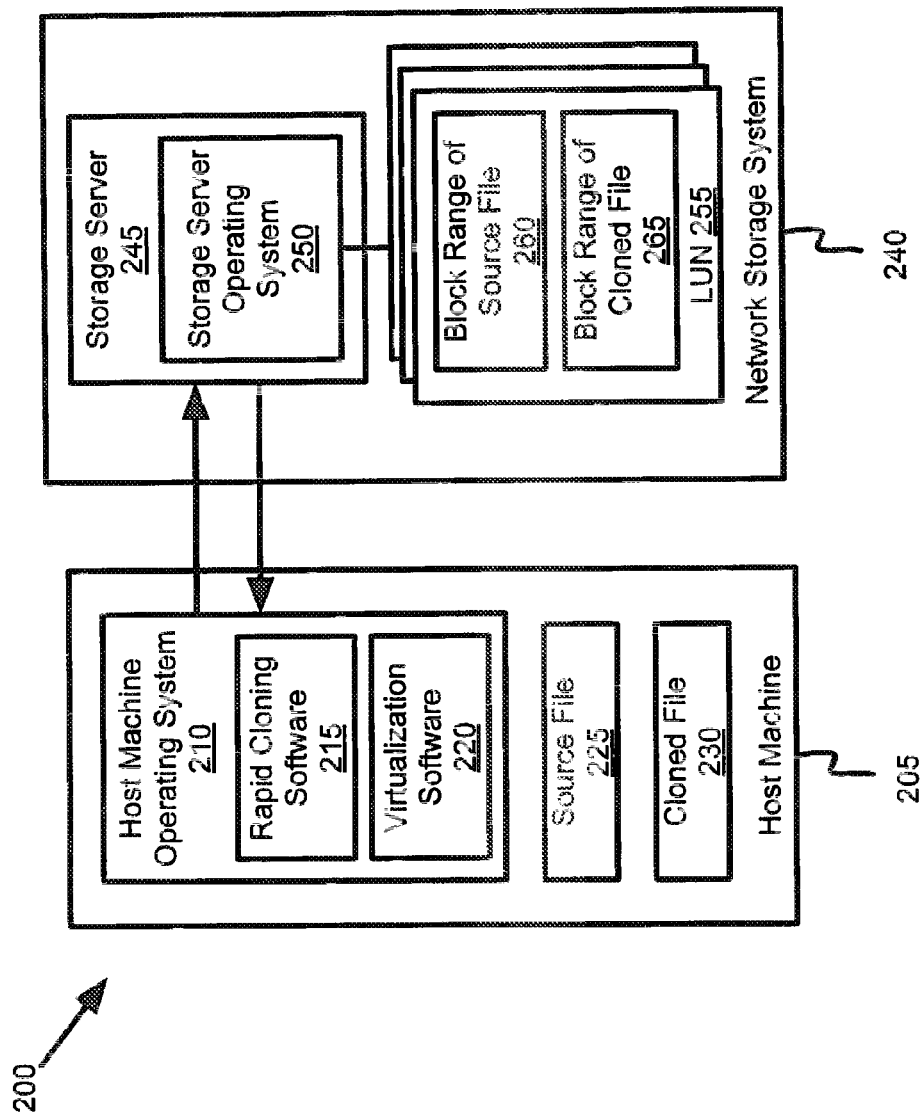
FIG. 2 is a block diagram of a rapid cloning environment according to an embodiment.
Figure 3:
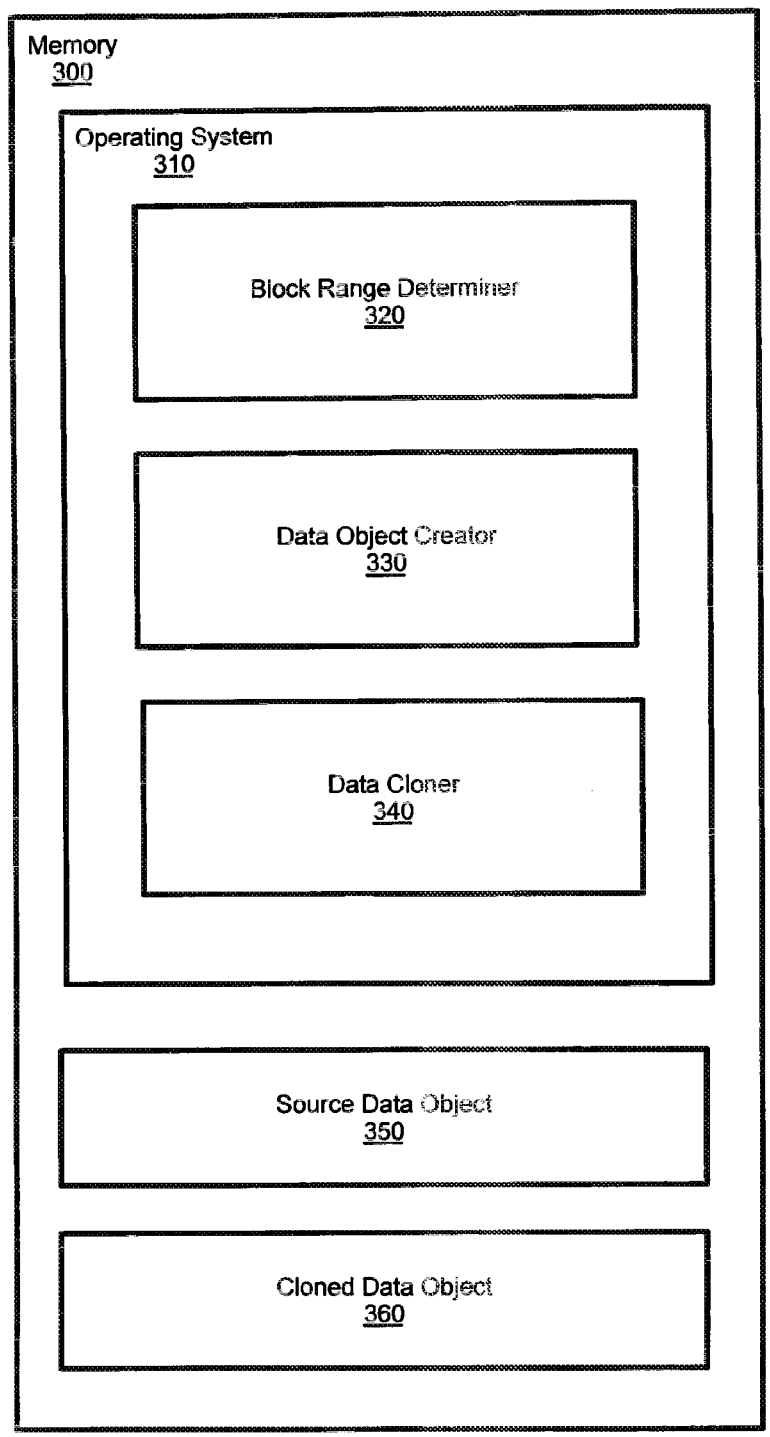
FIG. 3 is a block diagram illustrating a memory in a network storage system according to an embodiment.

FIG. 1 is an exemplary rapid cloning implementation according to an embodiment. FIG. 2 is a block diagram of a rapid cloning environment illustrating a detailed view of host machine 110 and storage system 120 of FIG. 1. FIG. 3 is an exemplary memory of host machine 205 of FIG. 2.

Referring to FIG. 1, host machine 110 has access to storage system 120, which provides access to data stored on storage devices 130 and 150. A user of host machine 110 may request rapid cloning of a file, or data object, stored on a storage device, such as file 140 on storage device 130. A clone of the file is created and stored on a storage device, such as cloned file 160 on storage device 150.

Referring to FIG. 2, rapid cloning environment 200 includes physical host machine 205 and network storage system 240. In one embodiment, network storage system 240 is a storage area network (SAN). Network storage system 240 may include storage server 245 configured to store and retrieve data. Network storage system 240 operates to store and manage shared storage objects (e.g., files) in a set of mass storage devices, such as magnetic or optical disks or tapes, or flash drives. The mass storage devices may be organized into one or more volumes of a Redundant Array of Inexpensive Disks (RAID). In a SAN context, storage server 245 provides block-level access to stored data, rather than file-level access.

Host machine 205 includes host machine operating system 210, such as for example, Microsoft Windows Server® 2008 R2. Host machine operating system 210 may include rapid cloning software 215 for cloning of a file, or data object. For example, host machine operating system 210 may clone source file 225 to cloned file 230. Host machine operating system 210 may include a hypervisor, such as for example, Hyper-V in the Microsoft Windows Server® 2008 R2 operating system. Host machine operating system 210 enables host machine 205 to host one or more virtual machines (not shown), each running its own operating system. In one embodiment, host machine 205 is also running virtualization software 220 which may enable the provisioning of storage from network storage system 240 through the virtual machines. In one embodiment, virtualization software includes NetApp® SnapDrive™ for Windows, developed by NetApp, Inc. of Sunnyvale, Calif.

Network storage system 240 includes one or more Logical Unit Numbers (LUNs) 255, or logical storage units. Storage server operating system 250 running on storage server 245 of network storage system 240 creates LUN 255 and maps it to host machine 205. Mapping a LUN to host machine 205 may include writing an identifier of LUN 255 into a data structure representing the storage resources associated with host machine 205.

In network environment 200, a user may request to clone a file, such as source file 225. Rapid cloning software 215 determines block range of source file 260 in LUN 250. Cloned file 230 is created in host machine 205. Block range of cloned file 265 is determined. In one embodiment, block range of cloned file 265 is in the same LUN (LUN 255) as the block range of source file 260. In an alternate embodiment, block range of cloned file 265 is in a different LUN than LUN 255. Once block range of source file 260 and block range of cloned file 265 are determined, block range of source file 260 is mapped to block range of cloned file 265. Source file 225 is cloned to cloned file 230 using the mapping of block range of source file 260 to block range of cloned file 265. Once cloned file 230 is cloned, it is accessible to host machine operating system 210.

FIG. 3 is a memory 300 according to an embodiment. Memory 300 contains operating system 310, source data object 350, and cloned data object 360. Within operating system 310, there is block range determiner 320, data object creator 330, and data cloner 340. In other embodiments, the software components 320, 330, and 340 can be separate from and not part of an operating system. Although memory 300 has been shown as a single memory, this is just one illustrative embodiment. In alternate embodiments, memory 300 can be split into more than one memory. Although cloned data object 360 has been shown as stored within memory 300, this is just one illustrative embodiment. In alternate embodiments, cloned data object 360 may be stored within a different storage device.

Block range determiner 320, data object creator 330, and data cloner 340 are used by operating system 310 to implement rapid cloning of virtual machines on LUNs. Block range determiner 320 determines a block range in memory 310 for source data object 350 and a block range in memory 310 for cloned data object 360. Data object creator 330 creates an empty data object such as cloned data object 360. Data cloner 340 clones source data object 350 and stores the cloned data object in cloned data object 360.

Figure 4:
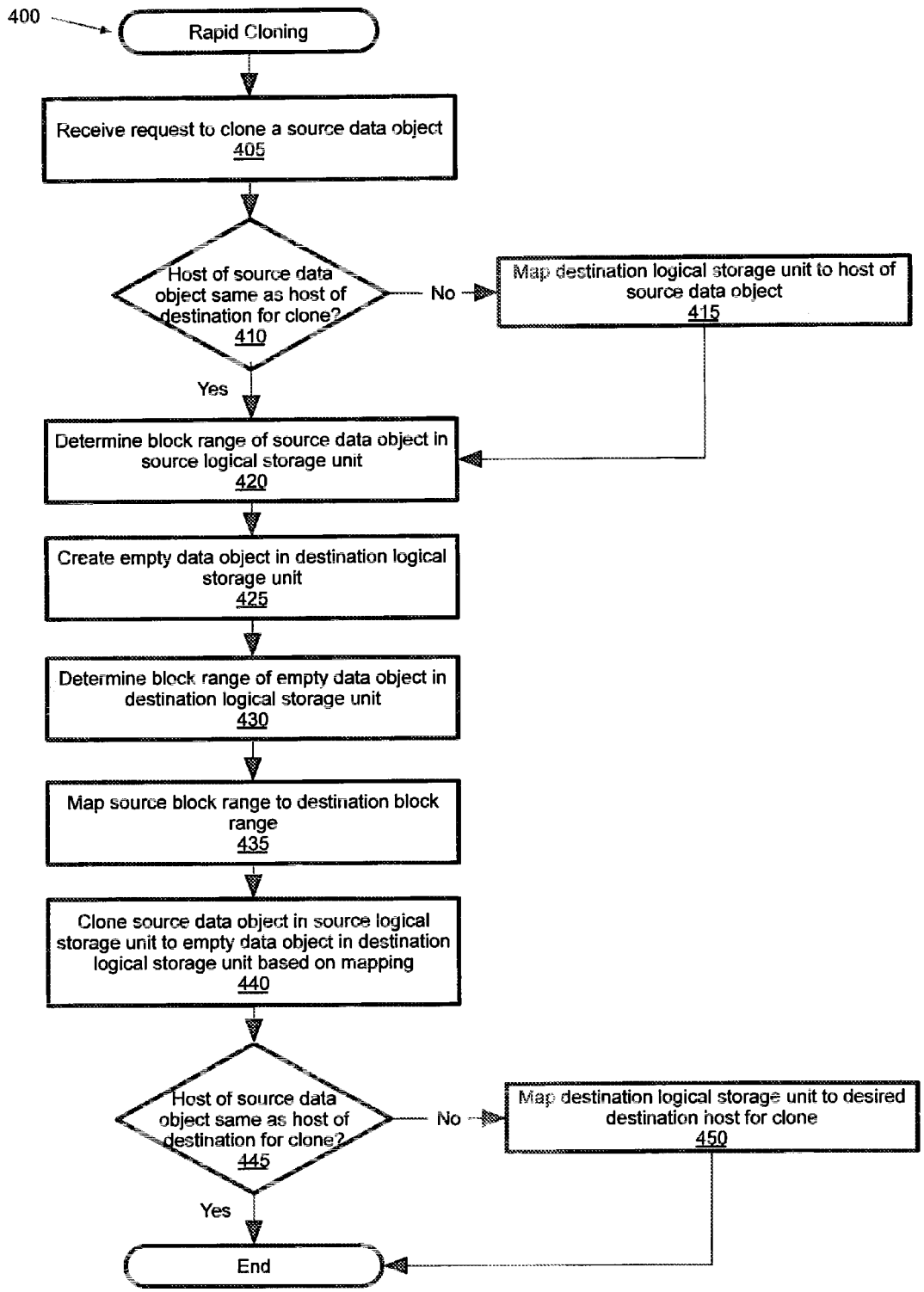
FIG. 4 illustrates a flow diagram of a rapid cloning method according to an embodiment.
Figure 5:
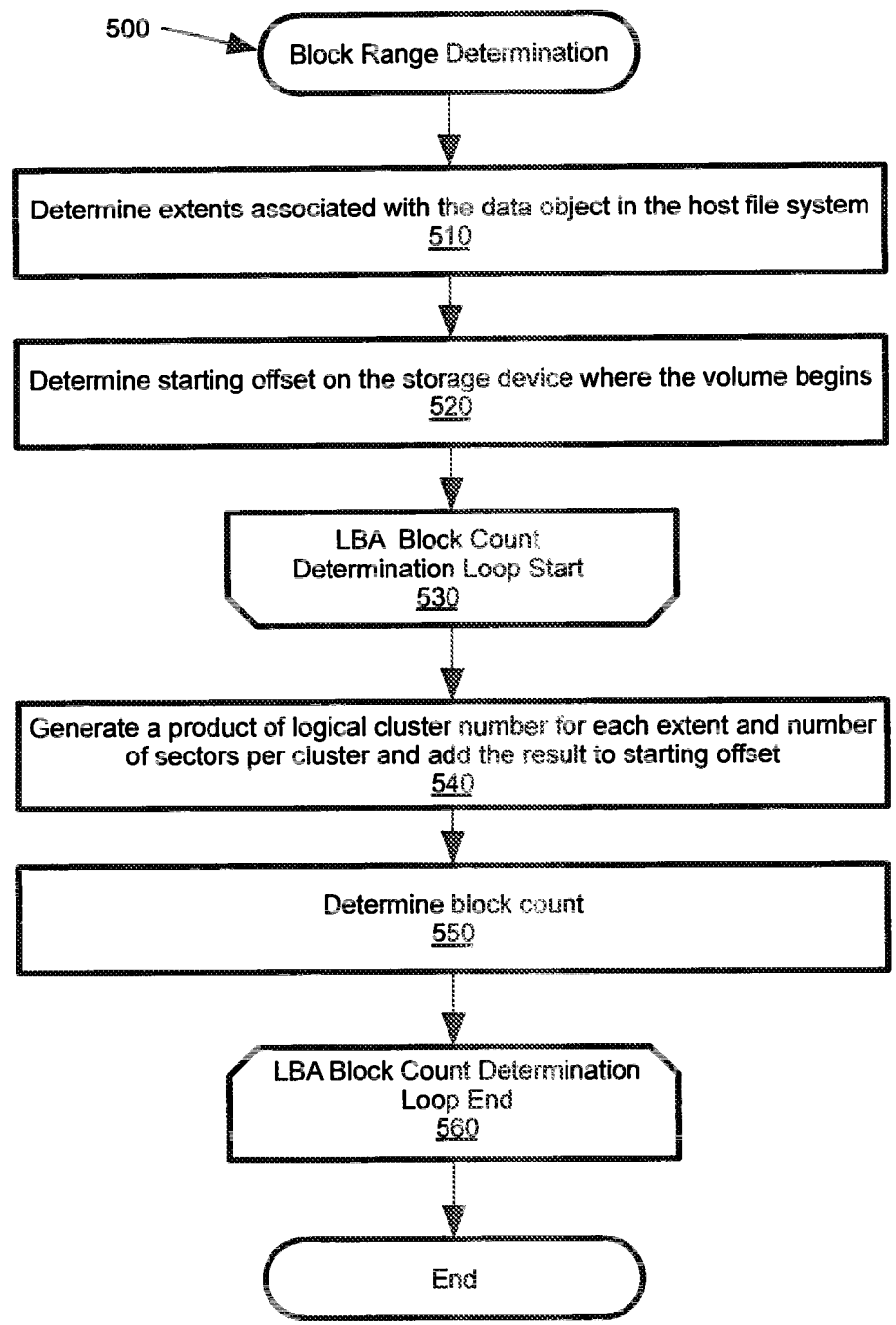
FIG. 5 illustrates a flow diagram of a block range determination method according to an embodiment.
Figure 6:
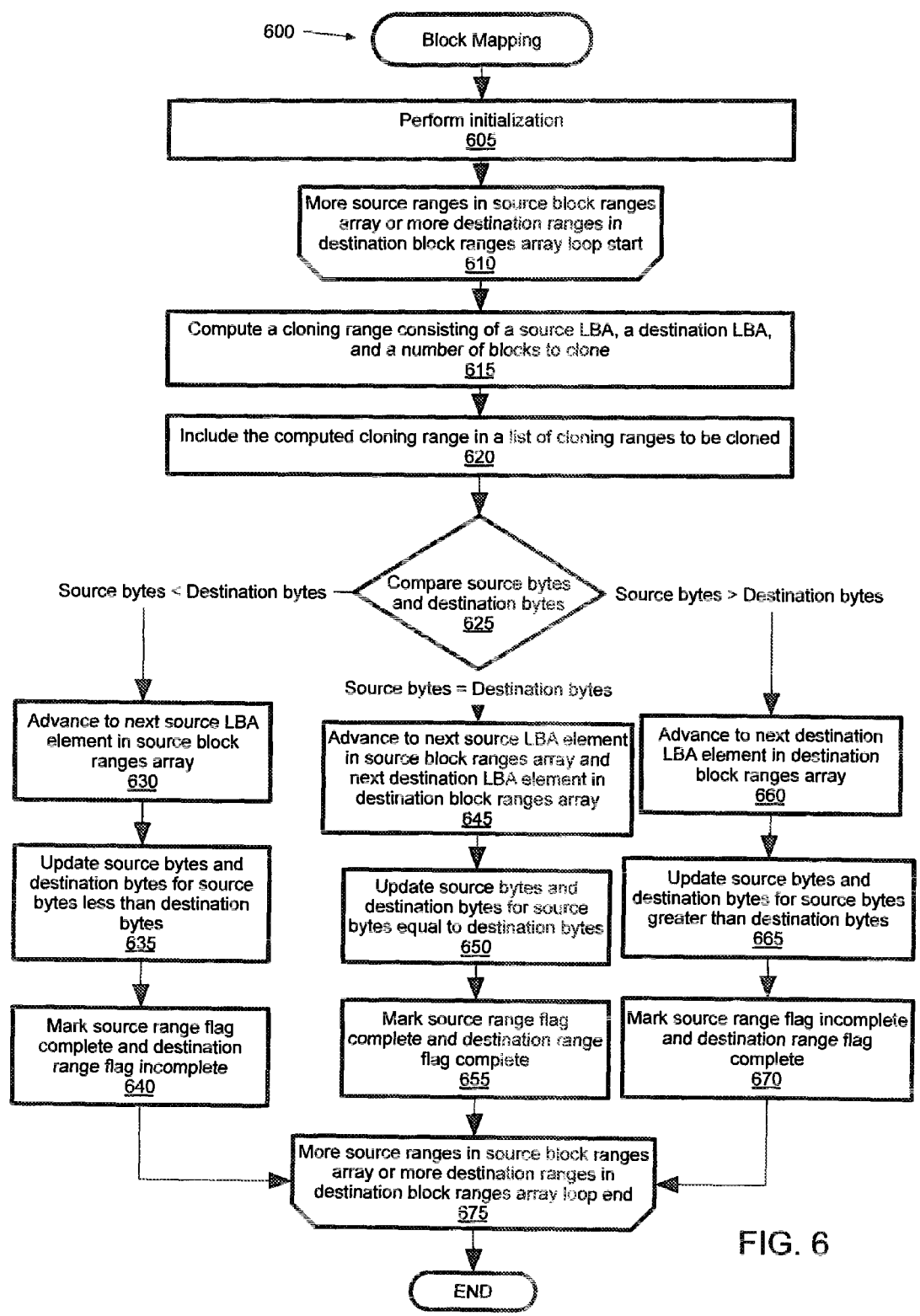
FIG. 6 illustrates a flow diagram of a block mapping method according to an embodiment.

FIGS. 4-6 are flow charts illustrating methods of rapid cloning. Referring to FIG. 4, the method 400 may be performed by processing logic that comprises hardware (e.g., circuitry, dedicated logic, programmable logic, microcode, etc.), software (e.g. instructions run on a processing device to perform hardware simulation), or a combination thereof, represented by processing instruction blocks 405-450 in FIG. 4. In certain embodiments, method 400 may be performed by storage system 120 of FIG. 1, storage operating system 280 of FIG. 2, and operating system 310 of FIG. 3.

A request to clone a data object is received at block 405. The request may be received from a user or administrator that selects one or more source data objects in a first system running a first operating system (e.g., Windows™, etc.). The source data objects are logically stored in a source logical storage unit (e.g., LUN) in a storage system running a storage operating system (e.g., NetApp® Data ONTAP™). The source logical storage unit in the storage system is mapped to the first system running the first operating system. The request may include a number of clones that the user desires to create of the source data object. In one embodiment, the request includes only the source data object and does not include a destination logical storage unit for the clones of the source data object. In this embodiment, the destination logical storage unit for the clone(s) of the source data object is set to the same logical storage unit (e.g., LUN) as the source logical storage unit of the source data object. In an alternate embodiment, the user may request a specific destination logical storage unit for the clone(s) of the source data object. The user may specify that the destination logical storage unit be mapped to a second system. In this embodiment, the destination logical storage unit can be in the same storage system as the first system. The clone(s) of the source data object are stored in the destination logical storage unit.

At block 410, the method determines if the host of the source data object is the same as the host of the destination for the clone. The determination may be made by 1) obtaining the host information for the host of the source logical storage unit storing the source data object, 2) obtaining the host information for the destination logical storage unit to store the clone, and 3) performing a comparison. In one embodiment, Windows Management Instrumentation™ (WMI) is used to obtain the host information. In an alternate embodiment, an API may be used obtain the host information. In one embodiment, the results of the comparison are stored for future use. In an alternate embodiment, the results of the comparison are not stored. If the host of the source data object is not equivalent to the host of the destination for the clone, the destination logical storage unit is mapped to the host of the data object to be cloned (the source logical storage unit) at block 415. In one embodiment, prior to mapping the destination logical storage unit to the host of the source logical storage unit, the destination logical storage unit is unmapped from a host of the destination logical unit. If the host of the source data object is equivalent to the host of the destination for the clone, the method does not need to perform a mapping, and the method proceeds to block 420.

At block 420, the method determines one or more block ranges of the source data object in the source logical storage unit. The determination is made as described below in conjunction with FIG. 5. The determination provides an array of source block ranges that includes a starting logical block address (LBA) and a block count (number of blocks) occupied by the source data object starting from the starting LBA for each element in the array (each source block range).

An empty destination data object is created in the destination logical storage unit at block 425. In one embodiment, the empty data object has a larger storage allocation than the data object to be cloned in order to provide storage for metadata associated with the cloned object. In an alternate embodiment, the size of the empty data object is equivalent to the size of the source data object.

Once the empty destination data object is created, the method determines a block range of the empty destination data object in the destination logical storage unit at block 430. The determination is made as described below in conjunction with FIG. 5. The determination provides an array of destination block ranges that includes a destination LBA and a block count (number of blocks) occupied by the destination data object starting from the destination LBA for each element in the array (each destination block range).

Mapping the source block range to the destination block range is performed at block 435. The data object to be cloned or the empty destination data object may be fragmented in the source and destination file system (e.g., NTFS) and the source and destination fragments may be of unequal sizes. Therefore, the fragments of the data object to be cloned may be mapped to the fragments of the empty destination data object. The mapping is performed as described below in conjunction with FIG. 6.

At block 440, the blocks of the source data object in the source logical storage unit are cloned to the empty data object in the destination logical storage unit based on the mapping determined at block 435.

At block 445, the method determines if the host of the source logical storage unit of the data object to be cloned is the same as the host of the destination for the clone. In one embodiment, the determination may be made by 1) obtaining the host information for the host of the source logical storage unit storing the data object to be cloned, 2) obtaining the host information for the destination logical storage unit to store the clone, and 3) performing a comparison. In one embodiment, Windows Management Instrumentation™ (WMI) is used to obtain the host information. In an alternate embodiment, an API may be used obtain the host information. In an alternate embodiment, a previously made determination stored in memory is obtained.

If the host of the source data object is not equivalent to the host of the destination for the clone, the destination logical storage unit is mapped to the desired destination host for the clone at block 450. In one embodiment, the destination logical storage unit is mapped to the desired destination host for the clone by using a Zephyr API (ZAPI™), a proprietary API of NetApp® and a WMI or Windows Virtual Disk Service API. As part of the mapping, the destination logical storage unit may first be disconnected from the host of the data object to be cloned (the source logical storage unit). If the host of the source data object is equivalent to the host of the destination for the clone, the method ends.

The cloning described above may be performed by using a cloning API. In one example, a Zephyr API (ZAPI™) for Single Instance Storage (SIS) clone, a proprietary API of NetApp®, is used to clone the data. In this example, an API, such as ZAPI, may provide for marshalling of API name and input parameters using XML (extensible markup language), with input parameters being typed and the contents of the XML being independent of the programming language and architecture on both client and server sides of a transaction, and with the server returning values from the invocation of the API marshaled in the same format as the input. The SIS clone ZAPI provides a method of reducing storage device (e.g., disk) space by eliminating duplicate data blocks on a flexible volume. Only a single instance of each unique data block is stored. The SIS clone ZAPI requires as input an array of block ranges to be cloned. Each block range contains an LBA for a source block, an LBA for a destination block, and a block count (a number of blocks to be cloned).

FIG. 5 is a flow chart illustrating a method 500 of determining a block range (as per instruction blocks 420 and 430) according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 510-560 in FIG. 5. In certain embodiments, method 500 may be performed by rapid cloning software 215 of FIG. 2, or block range determiner 320 of FIG. 3.

Referring to FIG. 5, the method 500 determines, or acquires, one or more extents associated with the data object in the host file system at block 510. An extent is a contiguous area of storage in a file system that is reserved for a data object. In one embodiment, the determination is made by calling a file system control operation, such as FSCTL_GET_RETRIEVAL_POINERS. The call for the file system control operation may require a file handle, in which case the data object may be passed as an input to the operation. The file handle can be obtained using an API. For example, the CreateFile API can be used to obtain the file handle with the path of the data object as input. The file system control operation returns one or more extents associated with the data object. Each extent includes a logical cluster number and a size for each of the extents. The extents are relative to the beginning of a volume device seen by a host operating system.

At block 520, the method determines the starting offset on the storage device (starting storage device offset) where the volume device containing the data object begins. In one embodiment, the starting sector offset on the storage device is obtained by calling a file system control operation, such as IOCTL_VOLUME_GET_VOLUME_DISK_EXTENTS. The call for the file system control operation may require a file handle, in which case the data object may be passed as an input to the operation. The file handle can be obtained using an API. For example, the CreateFile API can be used to obtain the file handle with the path of the data object as input. The method 500 executes a loop to determine an LBA block count beginning at block 530, ending at block 560, and performing the processes represented by blocks 540 and 550.

At block 540, a product is generated (e.g., multiply) of the logical cluster number for an extent and a number of sectors per cluster and the product is added to the starting sector offset to determine the start LBA of that extent. The start LBA may be stored in an array of start LBAs. In one embodiment, the number of sectors per cluster is acquired from the file system by calling a file system control operation.

At block 550, the block count for the extent is determined. In one embodiment, the size of the extent determined at block 510 is in units of clusters. The block count is calculated by converting the size of the extent from clusters into sectors. In one embodiment, this conversion is made by obtaining the sectors per cluster for the logical storage unit and generating a product of the size of the extent (in sector) and the sectors per cluster. In one embodiment, the sectors per cluster may be obtained by calling a file system control operation, such as the Windows API GetDiskFreeSpace. The product is the number of blocks occupied by the data object beginning at each start LBA. The number of blocks for each start LBA may be stored in the array of start LBAs.

FIG. 6 is a flow chart illustrating a method 600 of block mapping (as per instruction block 435 in FIG. 4) according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 605-675 in FIG. 6. In certain embodiments, method 600 may be performed by rapid cloning software 215 of FIG. 2 or data cloner 340 of FIG. 3.

Referring to FIG. 6, the method 600 performs an initialization at block 605. The initialization is performed by initializing a source range flag, a destination range flag, a current source range, a current destination range, a number of source bytes, a number of destination bytes, and a list of cloning ranges to be cloned. The initialization can include setting a source range flag to be complete and setting a destination range flag to be complete. The initialization can include initializing a current source range to the first source LBA element in a source block ranges array (e.g., array of source block ranges of FIG. 4 generated at block 420). The initialization can include initializing a current destination range to the first destination LBA element in a destination block range array (e.g., array of destination block ranges of FIG. 4 generated at block 430). The initialization can include initializing a variable for the number of source bytes to the first block count element in the source block ranges array (e.g., array of source block ranges of FIG. 4). The initialization can include initializing a number of destination bytes to the first block count element in the destination block ranges array (e.g., array of destination block ranges of FIG. 4). The initialization can include initializing a list of ranges to be cloned to empty.

The method 600 executes a loop to map source ranges to destination ranges by determining if there are more source ranges in source block ranges array or more destination ranges in destination block ranges array beginning at block 610, ending at block 675, and performing the processes represented by blocks 615 through 670.

At block 615, a cloning block range is computed. The cloning block range consists of a source LBA, a destination block LBA, and a number of blocks to clone. The source LBA can be determined by determining if the source range flag is set to be complete. If the source range flag is set to be complete, the source LBA is set to be the current source range. If the source range is not marked as complete, the source LBA is the sum of the current source range and a number of blocks to clone of the previous cloning range to be cloned. The destination LBA can be determined by determining if the destination range flag is set to be complete. If the destination range flag is set to be complete, the destination LBA is set to be the current destination range. If the destination range is not set to be complete, the destination LBA is the sum of the current destination LBA and a number of blocks to clone of the previous cloning range to be cloned. The number of blocks to clone is the minimum of the source bytes and the number of destination bytes.

The computed cloning block range (computed at block 615) is included in a list of cloning block ranges to be cloned at block 620. The method compares the number of source bytes to the number of destination bytes at block 625.

If the number of source bytes is less than the number of destination bytes, the source bytes from more than one source range (e.g., current and next range) must be mapped to the current destination range. If the number of source bytes is less than the number of destination bytes, the method sets the current source range to be the next source LBA element in the source block ranges array at block 630.

The source bytes and the destination bytes are updated at block 635. The source bytes are set to be the current block count element in the source block ranges array (corresponding to the current source LBA element). The destination bytes are determined by subtracting the number of blocks to clone from the current value of the destination bytes. The source range flag is marked complete and the destination range flag is marked incomplete at block 640.

If the number of source bytes is equal to the number of destination bytes, the source bytes must be mapped to the destination bytes, and the method sets the current source range to be the next source LBA element in the source block ranges array and the current destination range to be the next destination LBA element in the destination block ranges array at block 645.

The source bytes and the destination bytes are updated at block 650. The source bytes are determined by subtracting the number blocks to clone from the current value of the source bytes. The destination bytes are updated by subtracting the number of blocks to clone from the current value of the destination bytes. The source range flag is marked complete and the destination range flag is marked complete at block 655.

If the number of source bytes for the current source range is greater than the number of destination bytes for the current destination range, the source bytes must be mapped to more than one destination range. If the number of source bytes is greater than the number of destination bytes, the method sets the current destination range to be the next destination LBA element in the destination block ranges array at block 660.

The source bytes and the destination bytes are updated at block 665. The source bytes are determined by subtracting the number blocks to clone from the current value of the source bytes. The destination bytes are set to the current block count element in the destination block ranges array (corresponding to the current destination LBA element). The source range flag is marked incomplete and the destination range flag is marked complete at block 670.

Figure 7A:
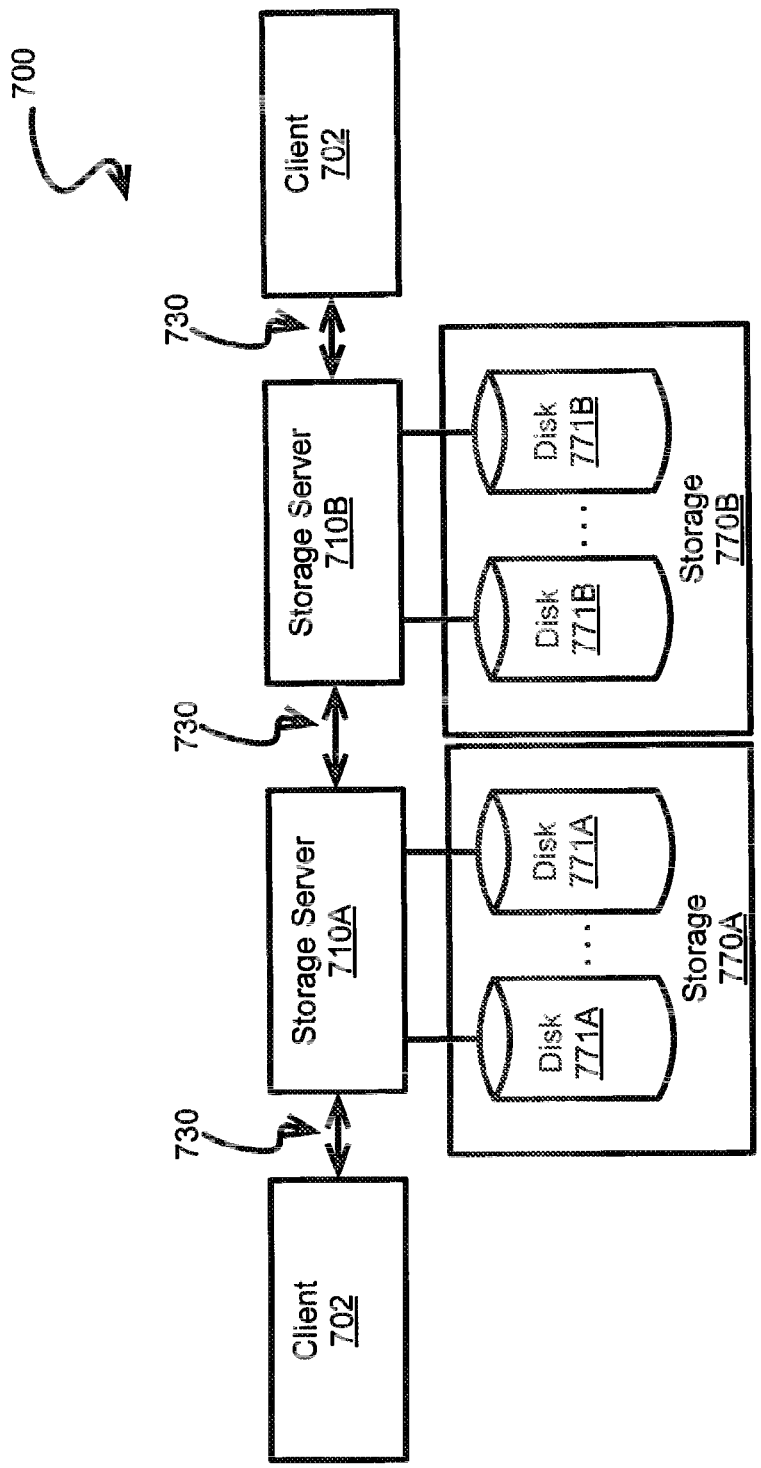
FIG. 7A illustrates a network storage system in which rapid cloning of virtual machines on LUNs may be implemented.

FIG. 7A shows a network storage system 700 in which rapid cloning can be implemented in one embodiment. Storage servers 710 (storage servers 710A, 710B), such as storage system 120 of FIG. 1, each manage multiple storage units 770 (storage 770A, 770B) that include mass storage devices, such as storage device 130 and 150 of FIG. 1. These storage servers provide data storage services to one or more clients 702 through a network 730. Network 730 may be, for example, a local area network (LAN), wide area network (WAN), metropolitan area network (MAN), global area network such as the Internet, a Fibre Channel fabric, or any combination of such interconnects. Each of clients 702 may be, for example, a conventional personal computer (PC), server-class computer, workstation, handheld computing or communication device, or other special or general purpose computer, such as host machine 110 of FIG. 1.

Storage of data in storage units 770 is managed by storage servers 710 which receive and respond to various read and write requests from clients 702, directed to data stored in or to be stored in storage units 770. Storage units 770 constitute mass storage devices which can include, for example, flash memory, magnetic or optical disks, or tape drives, illustrated as disks 771 (771A, 771B). The storage devices 771 can further be organized into arrays (not illustrated) implementing a Redundant Array of Inexpensive Disks/Devices (RAID) scheme, whereby storage servers 710 access storage units 770 using one or more RAID protocols known in the art.

Storage servers 710 can provide file-level service such as used in a network-attached storage (NAS) environment, block-level service such as used in a storage area network (SAN) environment, a service which is capable of providing both file-level and block-level service, or any other service capable of providing other data access services. Although storage servers 710 are each illustrated as single units in FIG. 7A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 7B and embodiments of an D-module and an N-module are described further below with respect to FIG. 9.

In yet other embodiments, storage servers 710 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units.

In the embodiment of FIG. 7A, one of the storage servers (e.g., storage server 710A) functions as a primary provider of data storage services to client 702. Data storage requests from client 702 are serviced using disks 771A organized as one or more storage objects. A secondary storage server (e.g., storage server 710B) takes a standby role in a mirror relationship with the primary storage server, replicating storage objects from the primary storage server to storage objects organized on disks of the secondary storage server (e.g., disks 770B). In operation, the secondary storage server does not service requests from client 702 until data in the primary storage object becomes inaccessible such as in a disaster with the primary storage server, such event considered a failure at the primary storage server. Upon a failure at the primary storage server, requests from client 702 intended for the primary storage object are serviced using replicated data (i.e. the secondary storage object) at the secondary storage server.

It will be appreciate that in other embodiments, network storage system 700 may include more than two storage servers. In these cases, protection relationships may be operative between various storage servers in system 700 such that one or more primary storage objects from storage server 710A may be replicated to a storage server other than storage server 710B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 710 should be taken as illustrative only.

Figure 7B:
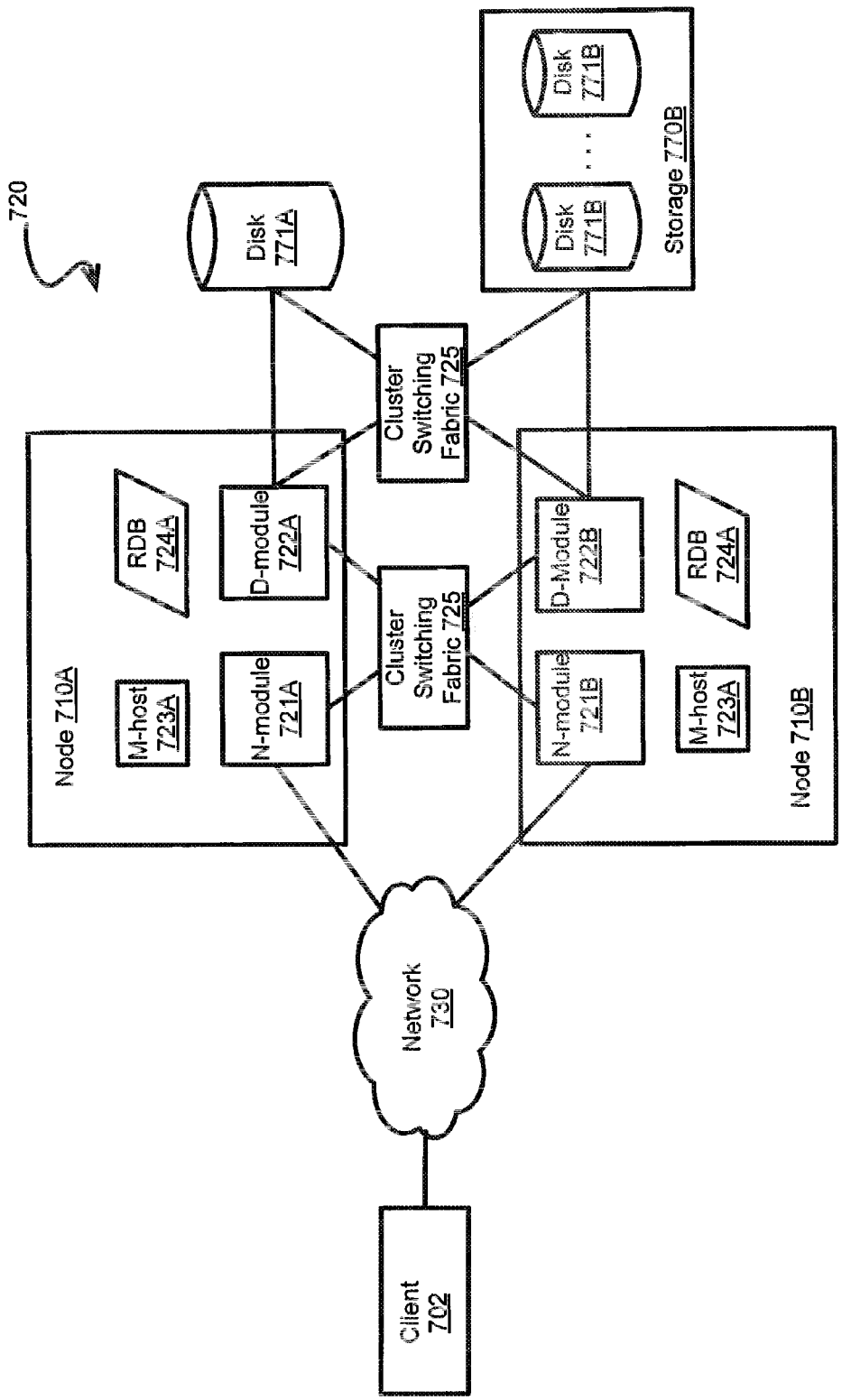
FIG. 7B illustrates a distributed or clustered architecture for a network storage system in which rapid cloning of virtual machines on LUNs may be implemented in an alternative embodiment.

FIG. 7B illustrates a block diagram of a distributed or clustered network storage system 720 which may implement rapid cloning in one embodiment. System 720 may include storage servers implemented as nodes 710 (nodes 710A, 710B) which are each configured to provide access to storage devices 771. In FIG. 7B, nodes 710 are interconnected by a cluster switching fabric 725, which may be embodied as an Ethernet switch.

Nodes 710 may be operative as multiple functional components that cooperate to provide a distributed architecture of system 720. To that end, each node 710 may be organized as a network element or module (N-module 721A, 721B), a disk element or module (D-module 722A, 722B), and a management element or module (M-host 723A, 723B). In one embodiment, each module includes a processor and memory for carrying out respective module operations. For example, N-module 721 may include functionality that enables node 710 to connect to client 702 via network 730 and may include protocol components such as a media access layer, Internet Protocol (IP) layer, Transport Control Protocol (TCP) layer, User Datagram Protocol (UDP) layer, and other protocols known in the art.

In contrast, D-module 722 may connect to one or more storage devices 771 via cluster switching fabric 725 and may be operative to service access requests on devices 770. In one embodiment, the D-module 722 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 7B, a storage abstraction layer (e.g., file system) of the D-module divides the physical storage of devices 770 into storage objects. Requests received by node 710 (e.g., via N-module 721) may thus include storage object identifiers to indicate a storage object on which to carry out the request.

Also operative in node 710 is M-host 723 which provides cluster services for node 710 by performing operations in support of a distributed storage system image, for instance, across system 720. M-host 723 provides cluster services by managing a data structure such as a RDB 724 (RDB 724A, RDB 724B) which contains information used by N-module 721 to determine which D-module 722 "owns" (services) each storage object. The various instances of RDB 724 across respective nodes 710 may be updated regularly by M-host 723 using conventional protocols operative between each of the M-hosts (e.g., across network 730) to bring them into synchronization with each other. A client request received by N-module 721 may then be routed to the appropriate D-module 722 for servicing to provide a distributed storage system image.

It should be noted that while FIG. 7B shows an equal number of N- and D-modules constituting a node in the illustrative system, there may be different number of N- and D-modules constituting a node in accordance with various embodiments of rapid cloning. For example, there may be a number of N-modules and D-modules of node 710A that does not reflect a one-to-one correspondence between the N- and D-modules of node 710B. As such, the description of a node comprising one N-module and one D-module for each node should be taken as illustrative only.

Figure 8:
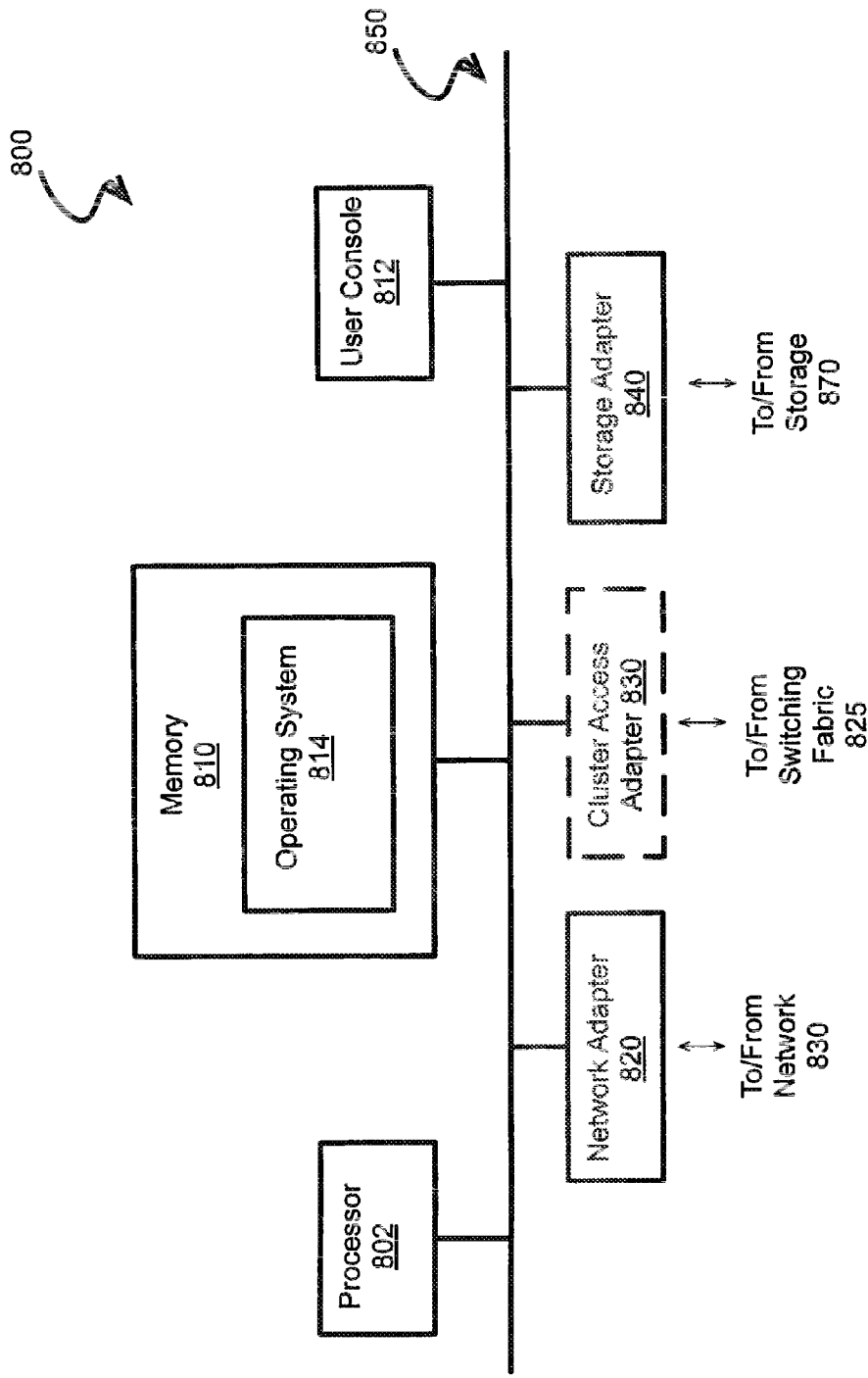
FIG. 8 is a block diagram of an illustrative embodiment of an environment including a rapid cloning manager of FIG. 8 in which the rapid cloning of virtual machines on LUNs may be implemented.

FIG. 8 is a block diagram of an embodiment of a storage server, such as storage servers 710A and 710B of FIG. 7A, embodied as a general or special purpose computer including a processor 802, a memory 810, a network adapter 820, a user console 812 and a storage adapter 840 interconnected by a system bus 850, such as a convention Peripheral Component Interconnect (PCI) bus.

Memory 810 includes storage locations addressable by processor 802, network adapter 820 and storage adapter 840 for storing processor-executable instructions and data structures associated with rapid cloning. Storage operating system 814, portions of which are typically resident in memory 810 and executed by processor 802, functionally organizes the storage server by invoking operations in support of the storage services provided by the storage server. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 802 and executable software can be implemented by hardware, such as integrated currents configured as programmable logic arrays, ASICs, and the like.

Network adapter 820 comprises one or more ports to couple the storage server to one or more clients over point-to-point links or a network. Thus, network adapter 820 includes the mechanical, electrical and signaling circuitry needed to couple the storage server to one or more client over a network. Each client may communicate with the storage server over the network by exchanging discrete frames or packets of data according to pre-defined protocols, such as TCP/IP.

Storage adapter 840 includes a plurality of ports having input/output (I/O) interface circuitry to couple the storage devices (e.g., disks) 870 to bus 821 over an I/O interconnect arrangement, such as a conventional high-performance, FC or SAS link topology. Storage adapter 840 typically includes a device controller (not illustrated) comprising a processor and a memory for controlling the overall operation of the storage units in accordance with read and write commands received from storage operating system 814. As used herein, data written by a device controller in response to a write command is referred to as "write data," whereas data read by device controller responsive to a read command is referred to as "read data."

User console 812 enables an administrator to interface with the storage server to invoke operations and provide inputs to the storage server using a command line interface (CLI) or a graphical user interface (GUI). In one embodiment, user console 812 is implemented using a monitor and keyboard.

When implemented as a node of a cluster, such as cluster 720 of FIG. 7B, the storage server further includes a cluster access adapter 830 (shown in phantom) having one or more ports to couple the node to other nodes in a cluster 825. In one embodiment, Ethernet is used as the clustering protocol and interconnect media, although it will apparent to one of skill in the art that other types of protocols and interconnects can by utilized within the cluster architecture.

Figure 9:
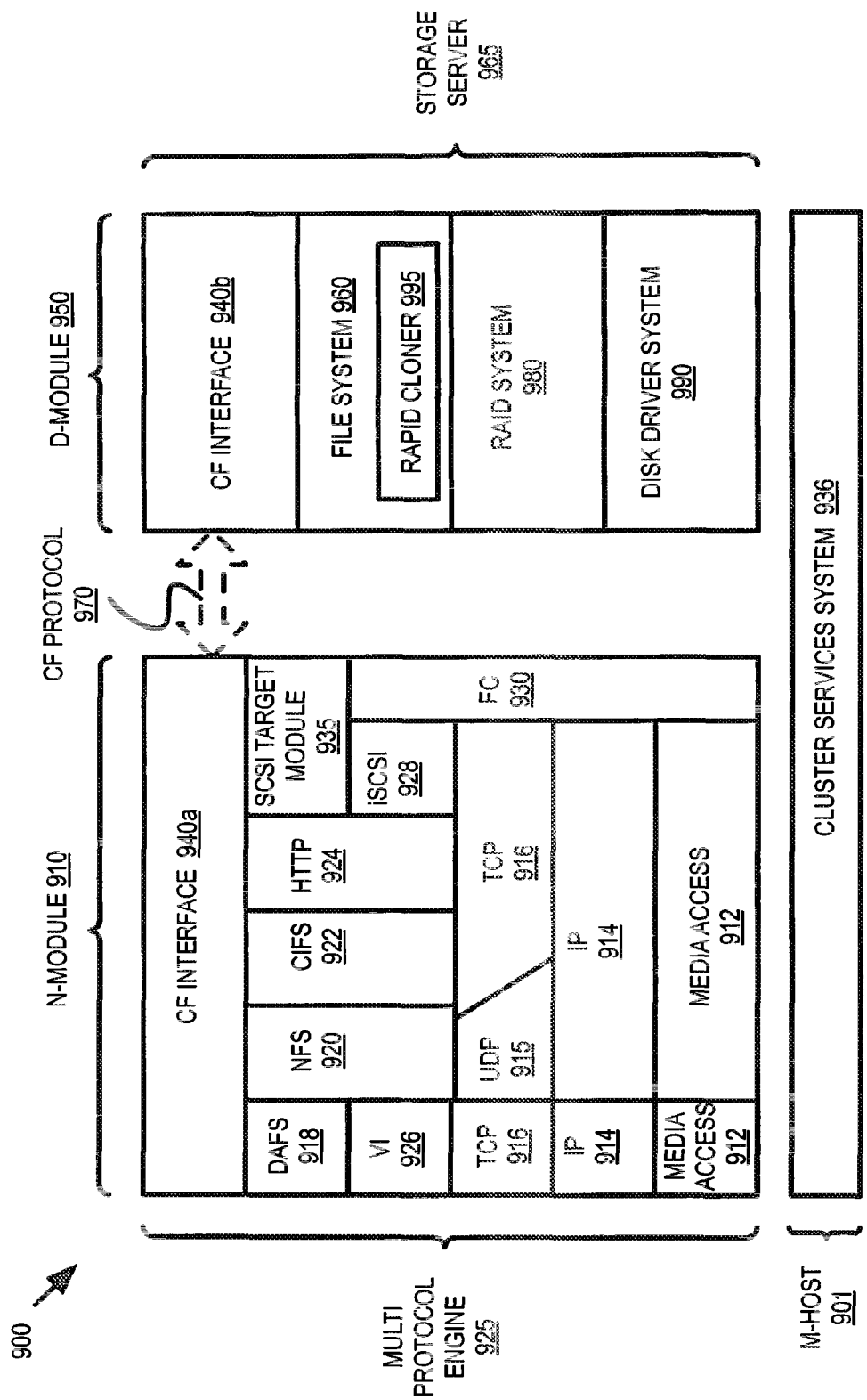
FIG. 9 illustrates an embodiment of the storage operating system of FIG. 8 in which rapid cloning of virtual machines on LUNs may be implemented.

FIG. 9 is a block diagram of a storage operating system, such as storage operating system 814 of FIG. 8, that implements an embodiment of rapid cloning. The storage operating system comprises a series of software layers executed by a processor, such as processor 802 of FIG. 8, and organized to form an integrated network protocol stack or, more generally, a multi-protocol engine 925 that provides data paths for clients to access information stored on the storage server using block and file access protocols.

Multi-protocol engine 925 includes a media access layer 912 of network drivers (e.g., gigabit Ethernet drivers) that interface with network protocol layers, such as the IP layer 914 and its supporting transport mechanisms, the TCP layer 916 and the User Datagram Protocol (UDP) layer 915. A file system protocol layer provides multi-protocol file access and, to that end, includes support for the Direct Access File System (DAFS) protocol 918, the NFS protocol 920, the CIFS protocol 922 and the Hypertext Transfer Protocol (HTTP) protocol 924. A VI layer 926 implements the VI architecture to provide direct access transport (DAT) capabilities, such as RDMA, as required by the DAFS protocol

918. An iSCSI driver layer 928 provides block protocol access over the TCP/IP network protocol layers, while a FC driver layer 930 receives and transmits block access requests and responses to and from the storage server. In certain cases, a Fibre Channel over Ethernet (FCoE) layer (not shown) may also be operative in multi-protocol engine 925 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 965 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (vbn) spaces, wherein each volume is associated with a unique vbn.

File system 960 implements a virtualization system of the storage operating system through the interaction with one or more virtualization modules (illustrated as a SCSI target module 935). SCSI target module 935 is generally disposed between drivers 928, 930 and file system 960 to provide a translation layer between the block (lun) space and the file system space, where luns are represented as blocks. In one embodiment, file system 960 implements a WAFL (write anywere file layout) file system having an on-disk format representation that is block-based using, e.g., 4 kilobyte (KB) blocks and using a data structure such as index nodes ("inodes") to identify files and file attributes (such as creation time, access permissions, size and block location). File system 960 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 912 or layer 930 processes the packet and, if appropriate, passes it on to a network protocol and file access layer for additional processing prior to forwarding to file system 960. There, file system 960 generates operations to load (retrieve) the requested data from the disks if it is not resident "in core", i.e., in memory 810. If the information is not in memory, file system 960 accesses the inode file to retrieve a logical vbn and passes a message structure including the logical vbn to the RAID system 980. There, the logical vbn is mapped to a disk identifier and device block number (disk,dbn) and sent to an appropriate driver of disk driver system 990. The disk driver accesses the dbn from the specified disk and loads the requested data block(s) in memory for processing by the storage server. Upon completion of the request, the node (and operating system 900) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 820, 840 may be configured to offload some or all of the packet processing and storage access operations, respectively, from processor 802, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 950 for accessing data stored on disk. In contrast, multi-protocol engine 925 may be embodied as N-module 910 to perform protocol termination with respect to a client issuing incoming access over the network, as well as to redirect the access requests to any other N-module in the cluster. A cluster services system 936 may further implement an M-host (e.g., M-host 901) to provide cluster services for generating information sharing operations to present a distributed file system image for the cluster. For instance, media access layer 912 may send and receive information packets between the various cluster services systems of the nodes to synchronize the replicated databases in each of the nodes.

In addition, a cluster fabric (CF) interface module 940 (CF interface modules 940A, 940B) may facilitate intra-cluster communication between N-module 910 and D-module 950 using a CF protocol 970. For instance, D-module 950 may expose a CF application programming interface (API) to which N-module 910 (or another D-module not shown) issues calls. To that end, CF interface module 940 can be organized as a CF encoder/decoder using local procedure calls (LPCs) and remote procedure calls (RPCs) to communicate a file system command to between D-modules residing on the same node and remote nodes, respectively.

Rapid cloning of virtual machines in LUNs requires translating the host machine's view of a file to an LBA range used for cloning by the storage system and may be performed by rapid cloner 995 in file system 960. A source block range in a source logical storage unit in RAID system 980 is determined. An empty data object is created in a destination logical storage unit in RAID system 980. A destination block range of the empty data object is determined. The source data object is cloned to the empty data object.

Although the present invention is shown herein to implement rapid cloning within the storage operating system, it will be appreciated that rapid cloning may be implemented in other modules or components of the storage server in other embodiments. In addition, rapid cloning may be implemented as one or a combination of a software-executing processor, hardware or firmware within the storage server. As such, rapid cloning may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write in place file systems.

In practice, the methods 400, 500, and 600 may constitute one or more programs made up of computer-executable instructions. Describing the methods with reference to the flowchart in FIGS. 4, 5, and 6 enables one skilled in the art to develop such programs, including such instructions to carry out the operations (acts) represented by logical blocks 400 until 450, 500 until 560, and 600 until 680 on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 400, 500, and 600 without departing from the scope of the invention and that no particular order is implied by the arrangement of blocks shown and described herein.

Rapid cloning of virtual machines on LUNs has been described. Although specific embodiments have been illustrated and described herein, it will be appreciated by those of ordinary skill in the art that any arrangement which is determined to achieve the same purpose may be substituted for the specific embodiments shown. This application is intended to cover any adaptations or variations of the present invention.

Moreover, the description of FIGS. 7A-7B is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, may be coupled to the storage server. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

Therefore, it is manifestly intended that this invention be limited only by the following claims and equivalents thereof.

What is claimed is:

1. A computerized method comprising:
receiving a request to clone a data object stored in a first logical storage unit to a second logical storage unit;
determining a host of the first logical storage unit and a host of the second logical storage unit at a time of the request;
when the host of the first logical storage unit is different than the host of the second logical storage unit at the time of the request, mapping the second logical storage unit to the host of the first logical storage unit;
determining a first block range of the data object in the first logical storage unit;
creating an empty data object in the second logical storage unit while mapped to the host of the first logical storage unit;
determining a second block range of the empty data object in the second logical storage unit;
generating a mapping of the first block range to the second block range;
cloning the data object to the empty data object based on the mapping of the first block range to the second block range; and
when the host of the first logical storage unit is different than the host of the second logical storage unit at the time of the request, remapping, after the cloning is complete, the second logical storage unit from the host of the first logical storage unit at the time of the request to the host of the second logical storage unit at the time of the request.

2. The method of claim 1, wherein the first block range comprises a starting logical block address and a block count indicating a number of storage blocks occupied by the data object.

3. The method of claim 1, wherein the determining the first block range comprises:
determining one or more storage device offsets for the data object; and
for a first storage device offset of the one or more storage device offsets, determining a number of clone blocks from the first storage device offset.

4. The method of claim 3, wherein the determining one or more storage device offsets for the data object comprises:

determining an extent associated with the data object, wherein the extent comprises a logical cluster number;

determining a starting offset on a storage device comprising the first logical storage unit; and deriving the first storage device offset from the logical cluster number and the starting offset.

5. The method of claim 3, wherein the determining a number of clone blocks from the first storage device offset comprises:

acquiring a size of an extent associated with the data object;

acquiring a number of sectors per cluster; and determining the number of clone blocks based on the size of the extent and the number of sectors per cluster.

6. The method of claim 1, wherein the mapping of the first block range to the second block range comprises:

computing a cloning range based on the first block range and the second block range; and comparing a number of bytes in the first block range to a number of bytes in the second block range.

7. The method of claim 1, wherein the first logical storage unit comprises a first plurality of contiguous storage areas and the second logical storage unit comprises a second plurality of contiguous storage areas and wherein the generating the mapping of the first block range to the second block range comprises:

generating a plurality of entries in a data structure, wherein each entry of the plurality of entries is created to indicate a storage area of the first plurality of contiguous storage areas as a source for cloning, a storage area of the second plurality of contiguous storage areas as a destination for the cloning, and a number of blocks to be cloned from the source to the destination.

8. A non-transitory computer readable medium having stored thereon machine executable code which when executed by at least one machine, causes the machine to:

receive a clone request to clone a data object stored in a first logical storage unit to a second logical storage unit;

determine a host of the first logical storage unit and a host of the second logical storage unit at a time of the clone request;

when the host of the first logical storage unit is different than the host of the second logical storage unit at the time of the clone request, map the second logical storage unit to the host of the first logical storage unit;

determine a first plurality of extents for the data object after receipt of the clone request, wherein the first plurality of extents are associated with the first logical storage unit;

create an empty data object with a second plurality of extents associated with the second logical storage unit after receipt of the clone request, wherein the second plurality of extents are at least a same size as the first plurality of extents for the data object;

generate a mapping of the first plurality of extents to the second plurality of extents that accounts for variations in range of the extents;

clone data of the first plurality of extents to the second plurality of extents in accordance with the mapping of the first plurality of extents to the second plurality of extents; and when the host of the first logical storage unit is different than the host of the second logical storage unit at the time of the clone request, remap, after the data object is cloned, the second logical storage unit from the host of the first logical storage unit at the time of the clone request to the host of the second logical storage unit at the time of the clone request.

9. The non-transitory computer readable medium of claim 8, wherein the first plurality of extents correspond to a contiguous area of storage that is reserved for the data object.

10. The non-transitory computer readable medium of claim 8, wherein each extent of the first plurality of extents comprises a logical cluster number and a cluster size.

11. The non-transitory computer readable medium of claim 8, wherein the machine executable code causes the machine to determine a first block range of the data object in the first logical storage unit.

12. The non-transitory computer readable medium of claim 11, wherein a first extent of the first plurality of extents comprises a logical cluster number and determining the first block range comprises:

determining a starting offset on a storage device comprising the first logical storage unit;

deriving a first storage device offset from the logical cluster number and the starting offset; and determining a number of clone blocks from the first storage device offset.

13. The non-transitory computer readable medium of claim 8, wherein the machine executable code causes the machine to generate a plurality of entries in a data structure, wherein each of the plurality of entries is created to indicate an extent of the first plurality of extents as a source for cloning, an extent of the second plurality of extents as a destination for the cloning, and a number of blocks to be cloned from the source to the destination.

14. A storage server comprising:

a processor;

a network interface; and a non-transitory machine readable storage medium having program instructions stored thereon, the program instructions executable by the processor to cause the storage server to:

receive a clone request to clone a data object stored in a first logical storage unit to a second logical storage unit;

determine a host of the first logical storage unit and a host of the second logical storage unit at a time of the clone request;

when the host of the first logical storage unit is different than the host of the second logical storage unit at the time of the clone request, map the second logical storage unit to the host of the first logical storage unit;

determine a first plurality of extents for the data object after receipt of the clone request over the network interface, wherein the first plurality of extents are associated with the first logical storage unit;

create an empty data object with a second plurality of extents associated with the second logical storage unit also after receipt of the clone request over the network interface, wherein the second plurality of extents are at least a same size as the first plurality of extents for the data object;

generate a mapping of the first plurality of extents to the second plurality of extents that accounts for variations in range of the extents;

clone data of the first plurality of extents to the second plurality of extents in accordance with the mapping of the first plurality of extents to the second plurality of extents; and when the host of the first logical storage unit is different than the host of the second logical storage unit at the time of the clone request, remap, after the data object is cloned, the second logical storage unit from the host of the first logical storage unit at the time of the clone request to the host of the second logical storage unit at the time of the clone request.

15. The storage server of claim 14, wherein the non-transitory machine readable storage medium has program instructions executable by the processor to cause the storage server to communicate an identifier of the second logical storage unit at the time of the clone request to the host of the first logical storage unit at the time of the clone request.

16. The storage server of claim 15, wherein the non-transitory machine readable storage medium has program instructions executable by the processor to cause the storage server to determine whether the host of the first logical storage unit at the time of the clone request is different than the host of the second logical storage unit at the time of the clone request based upon the identifier.

17. The storage server of claim 14, wherein the non-transitory machine readable storage medium has program instructions executable by the processor to cause the storage server to direct the host of the second logical storage unit at the time of the clone request to indicate that the second logical storage unit is no longer mapped thereto after mapping the second logical storage unit to the host of the first logical storage unit.

18. The storage server of claim 14, wherein the non-transitory machine readable storage medium has program instructions executable by the processor to cause the storage server to send, after the data object is cloned, an identifier of the second logical storage unit to the host of the second logical storage unit at the time of the clone request.

19. The storage server of claim 14, wherein the non-transitory machine readable storage medium has program instructions executable by the processor to cause the storage server to generate a plurality of entries in a data structure, wherein each of the plurality of entries is created to indicate an extent of the first plurality of extents as a source for cloning, an extent of the second plurality of extents as a destination for the cloning, and a number of blocks to be cloned from the source to the destination.

20. The storage server of claim 18, wherein the non-transitory machine readable storage medium has program instructions executable by the processor to cause the storage server to remap the second logical storage unit to the host of the second logical storage unit at the time of the clone request based upon the identifier.

* * * * *